United States Patent
Kang et al.

(10) Patent No.: US 12,035,053 B2
(45) Date of Patent: Jul. 9, 2024

(54) METHOD FOR PROCESSING PHOTOGRAPHED IMAGE AND ELECTRONIC DEVICE THEREFOR

(71) Applicant: Samsung Electronics Co., Ltd., Gyeonggi-do (KR)

(72) Inventors: Changhoon Kang, Gyeonggi-do (KR); Byounggeun Choi, Gyeonggi-do (KR); Sangheum Cho, Gyeonggi-do (KR); Daehyun Sung, Gyeonggi-do (KR); Wooyong Lee, Gyeonggi-do (KR); Hansol Choi, Gyeonggi-do (KR); Jiyoon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 17/432,195

(22) PCT Filed: Feb. 17, 2020

(86) PCT No.: PCT/KR2020/002185
§ 371 (c)(1),
(2) Date: Aug. 19, 2021

(87) PCT Pub. No.: WO2020/171492
PCT Pub. Date: Aug. 27, 2020

(65) Prior Publication Data
US 2023/0133394 A1 May 4, 2023

(30) Foreign Application Priority Data
Feb. 19, 2019 (KR) ........................ 10-2019-0019554

(51) Int. Cl.
*H04N 23/80* (2023.01)
*G06T 5/00* (2024.01)
(Continued)

(52) U.S. Cl.
CPC ............... *H04N 23/80* (2023.01); *H04N 5/77* (2013.01); *H04N 23/633* (2023.01)

(58) Field of Classification Search
CPC .......... H04N 23/80; H04N 23/63; H04N 5/77; H04N 5/772; H04N 23/667; H04N 23/633; G06T 5/001
See application file for complete search history.

(56) References Cited

U.S. PATENT DOCUMENTS 7,671,904 B2  3/2010 Park
8,576,301 B2  11/2013 Okumura et al.
(Continued)

FOREIGN PATENT DOCUMENTS

EP  1 079 598 A2  2/2001
JP  2001-69454 A  3/2001
(Continued)

OTHER PUBLICATIONS

European Search Report dated Mar. 29, 2022.
Korean Office Action dated Sep. 8, 2023.

*Primary Examiner* — Marly S Camargo
(74) *Attorney, Agent, or Firm* — Cha & Reiter, LLC

(57) ABSTRACT

The present invention relates to image processing. A method for operating an electronic device may comprise: an operation of obtaining a plurality of images; an operation of storing one of the plurality of images as a first representative image; an operation of generating a corrected image by using at least one remaining image among the plurality of images; and an operation of storing the corrected image as a second representative image for substituting the first representative image.

12 Claims, 14 Drawing Sheets

(51) Int. Cl.
*G06T 5/50* (2006.01)
*H04N 5/77* (2006.01)
*H04N 23/63* (2023.01)

(56) References Cited

U.S. PATENT DOCUMENTS

| | | | |
|---|---|---|---|
| 8,675,110 B2 | 3/2014 | Hirai et al. | |
| 9,225,905 B2 | 12/2015 | Yoon et al. | |
| 9,538,087 B2 | 1/2017 | Choi et al. | |
| 10,097,756 B2* | 10/2018 | Levien | H04N 21/4223 |
| 2003/0151755 A1 | 8/2003 | Nishio et al. | |
| 2005/0190270 A1 | 9/2005 | Park | |
| 2007/0189731 A1 | 8/2007 | Okumura et al. | |
| 2008/0316331 A1 | 12/2008 | Jun | |
| 2009/0174786 A1 | 7/2009 | Joseph | |
| 2014/0036108 A1 | 2/2014 | Yoon et al. | |
| 2017/0026574 A1 | 1/2017 | Kwon et al. | |
| 2017/0244890 A1 | 8/2017 | Lee et al. | |
| 2019/0122339 A1 | 4/2019 | Moon et al. | |
| 2019/0208064 A1* | 7/2019 | Im | G06T 5/00 |
| 2023/0196529 A1* | 6/2023 | Yamaguchi | G06T 5/001 |
| 2023/0239576 A1* | 7/2023 | Lee | H04N 23/667 |

FOREIGN PATENT DOCUMENTS

| | | |
|---|---|---|
| JP | 2007-214938 A | 8/2007 |
| JP | 4085661 B2 | 2/2008 |
| JP | 2010-187250 A | 8/2010 |
| KR | 10-2007-0080708 A | 8/2007 |
| KR | 10-2014-0018686 A | 2/2014 |
| KR | 10-1391024 B1 | 4/2014 |
| KR | 10-2017-0098059 A | 8/2017 |
| KR | 10-2017-0112066 A | 10/2017 |
| WO | 2018/124692 A1 | 7/2018 |

* cited by examiner

METHOD FOR PROCESSING PHOTOGRAPHED IMAGE AND ELECTRONIC DEVICE THEREFOR

CROSS REFERENCE TO RELATED APPLICATIONS

This application is a National Phase Entry of PCT International Application No. PCT/KR2020/002185, which was filed on Feb. 17, 2020, and claims a priority to Korean Patent Application No. 10-2019-0019554, which was filed on Feb. 19, 2019, the contents of which are incorporated herein by reference.

TECHNICAL FIELD

Various embodiments of the disclosure relate to an electronic device, and relate to a method for processing a photographed image and an electronic device therefor.

BACKGROUND ART

An electronic device such as a smartphone provides various functions. One of functions frequently used by users is an image-capturing function using a camera. Accordingly, the importance of the camera is becoming more emphasized, and the users pay great attention to the performance, the quality, the usability, and the like of the camera. For improvement of the quality of an image, a technology of modifying an image through separate processing after image capturing may be used. Such a processing technology may require consumption of lots of resources of an electronic device.

DISCLOSURE OF INVENTION

Technical Problem

A memory and a time are consumed to improve the quality of an image and add an effect to an image, and accordingly, a problem in image-capturing speed reduction and overheating may occur. The speed reduction and overheating may constrain image quality improvement.

Various embodiments of the disclosure provide a method for more effectively processing a captured image and an electronic device therefor.

Solution to Problem

According to various embodiments of the disclosure, an operation method of an electronic device may include acquiring multiple images, storing one of the multiple images as a first representative image, generating a modified image by using at least one remaining image of the multiple images, and storing the modified image as a second representative image for replacing the first representative image.

According to various embodiments of the disclosure, an electronic device may include, a camera, a memory, and a processor operatively connected to the camera and the memory, wherein the processor performs control to acquire multiple images by using the camera, store one of the multiple images as a first representative image, generate a modified image by using at least one remaining image of the multiple images, and store the modified image as a second representative image for replacing the first representative image.

Advantageous Effects of Invention

A method and an electronic device therefor according to various embodiments can process an image according to a scheme determined in consideration of a situation and update a stored image, thereby resolving the constraint on the image quality improvement and expanding a user experience.

BEST MODE FOR CARRYING OUT THE INVENTION

Hereinafter, various embodiments will be described in detail with reference to accompanying drawings.

Figure 1:
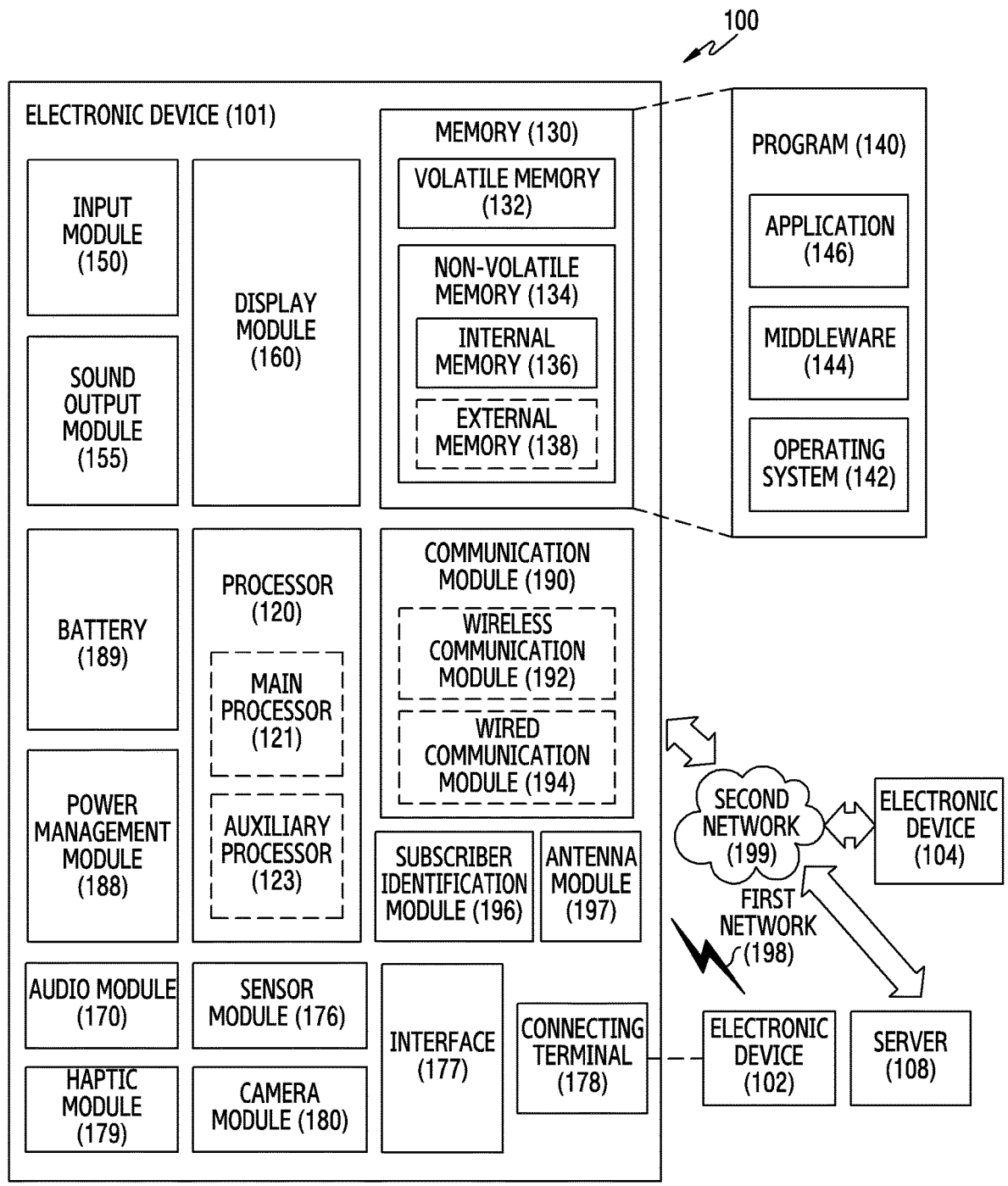
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 16o may visually provide information to the outside (e.g., a user) of the electronic device 101. The display device 16o may include, for example, a display, a hologram device, or a projector and control circuitry to control a corresponding one of the display, hologram device, and projector. According to an embodiment, the display device 16o may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 15o, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
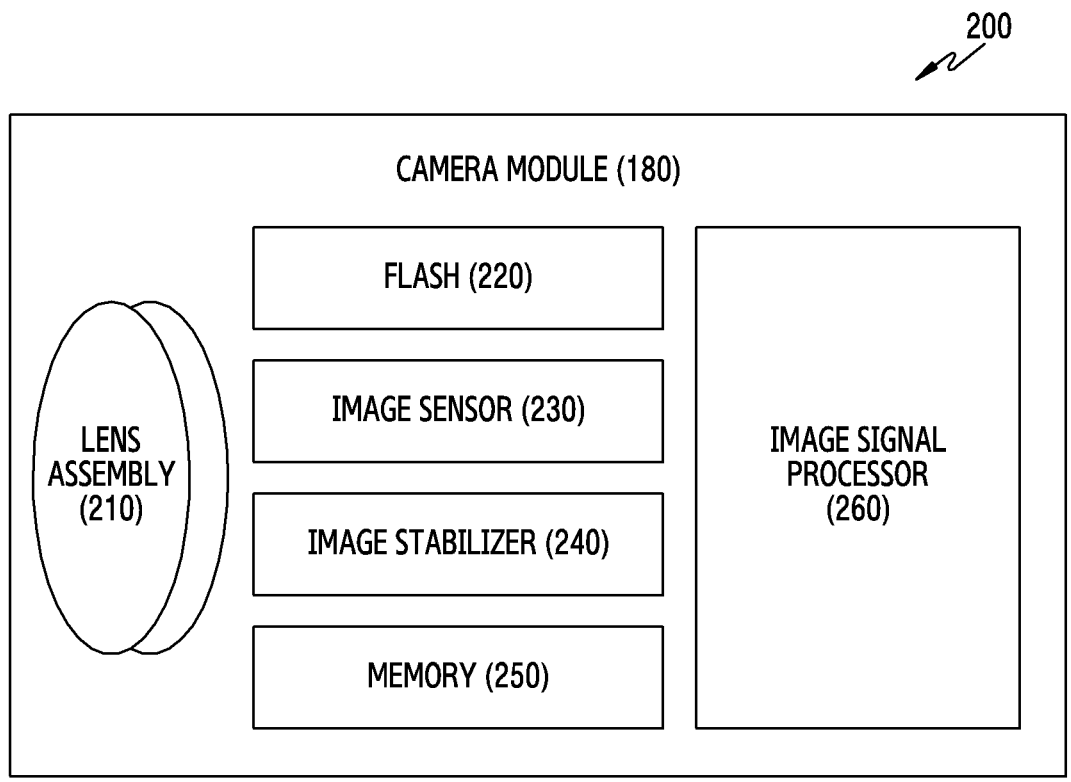
FIG. 2 is a block diagram 200 illustrating the camera module 180 according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

As described above, the electronic device 101 may include the camera module 180. The electronic device 101 may provide a function of taking a photograph or capturing an image, by using the camera module 180. Processing for improving the quality a captured image and/or adding an effect to the captured image can be performed, wherein the electronic device 101 according to various embodiments can efficiently manage an image and provide the optimal experience for a user, by adjusting an image processing scheme according to a capturing condition. Hereinafter, various embodiments of image processing will be described.

Figure 3:
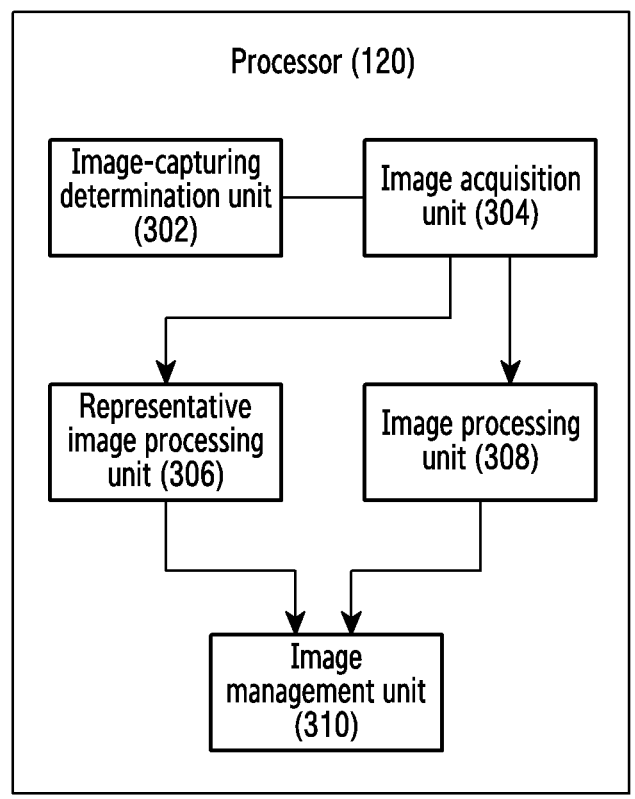
FIG. 3 is a functional block diagram of the processor in an electronic device according to various embodiments.

FIG. 3 is a functional block diagram of the processor 120 in the electronic device 101 according to various embodiments. Referring to FIG. 3, the processor 120 may include an image-capturing determination unit 302, an image acquisition unit 304, a representative image processing unit 306, an image processing unit 308, and/or an image management unit 310.

The image-capturing determination unit 302 may determine an image processing scheme by using information on an electronic device and image capturing. According to an embodiment, the image-capturing determination unit 302 may determine the image processing scheme by using a capturing mode or the state of the electronic device. For example, the image processing scheme may include immediate photo processing (IPP) or post photo processing (PPP). The PPP is a scheme in which an image is post-processed in a background service or a background process, wherein processing other commands of the user is allowed during the image processing operation. The IPP is a scheme of processing an image in a foreground process used for image capturing, wherein image processing can be performed in the IPP faster than the PPP, but inputs of other commands of the user may be blocked during the image processing. For example, the image-capturing determination unit 302 may dynamically determine whether to process an acquired image in a current image-capturing sequence (e.g., the IPP scheme) or in a background service (e.g., the PPP scheme), or to operate the image processing operation as a file or as a buffer, according to at least one of overheating, a memory state, a file input/output state, or a currently processing task, at an image-capturing time point. When there are multiple background service tasks, the image-capturing determination unit 302 may perform a role of adjusting processing scheduling in the current image-capturing sequence. The background service may be referred to as a background process.

According to another embodiment, the image-capturing determination unit 302 may determine whether to perform single image-capturing or compound image-capturing according to a feature of a current scene and the performance of the electronic device 101, and determine the number of consecutive times of image capturing, an image-capturing format, and/or an image size. For example, in a case of a multi-frame high dynamic range (MFHDR) in which an image is captured three times, the electronic device 101 may acquire a thumbnail image, a first compound source image, and/or a temporary representative image, through first image-capturing, acquire a second compound source image through second image-capturing, and acquire a third compound source image through third image-capturing. The thumbnail image, the first compound source image, and/or the temporary representative image, acquired through the first image-capturing, corresponds to images that are simultaneously captured, wherein the sizes and/or formats thereof may be different from each other. For example, the thumbnail image may be a small-sized image which follows a YUV format, the first compound source image may be a real picture-sized image which follows a YUV format, and the temporary representative image may be a real picture-sized image which follows a joint photograph experts group (JPEG) or a high efficiency image file (HEIF) format.

The image acquisition unit 304 may acquire at least one image required to store or process an image. For example, at least one image required according to the determination by the image-capturing determination unit 302 may be determined, wherein at least one stream may be operated to acquire the at least one determined image. The number of operated streams may depend on the image processing scheme determined by the image-capturing determination unit 302. The at least one acquired image may be provided for the representative image processing unit 306 and the image processing unit 308.

The representative image processing unit 306 may process an image temporarily displayed as a representative image among at least one image acquired by the image acquisition unit 304. The representative image is an image displayed as a result of the image capturing, wherein one representative image corresponds to one image-capturing command (e.g., a touch on a shutter button) that is generated by the user. The representative image may be displayed according to a selection by the user from a photographing or image viewer application. When a scheme (e.g., the PPP scheme) of modifying an image in the background service is selected, the initial image before the modification is displayed as a representative image, and the representative image may be replaced with the modified image once the modification is completed.

The temporary representative image until completion of the image modification may be different from a final representative image, and may be managed in a manner different from the final representative image. According to an embodiment, the representative image processing unit 306 may control authority to access the temporary representative image so that the temporary representative image is used within a range shown to the user as a final result. For example, the representative image processing unit 306 may restrict a function of attaching and/or uploading the temporary representative image to a cloud server. For example, the representative image processing unit 306 may store an image used as the temporary representative image in a memory area having restricted access authority, or may configure restricted authority to access to the image.

The image processing unit 308 may modify at least one acquired image. For example, the image processing unit 308 may perform at least one modification operation for improving the quality of the image and/or adding an effect to the image according to the usage of the image and the necessity. For example, the modification operation for improving the quality of the image may include noise reduction, super-wide angle lens distortion modification, wide angle face distortion modification, image tone changing, beauty effect application, resolution adjustment, brightness adjustment, a blurring, sharpening, or softening effect, a high dynamic range (HDR) effect, and/or a bokeh effect. The details of the modification may be determined by the image-capturing determination unit 302. According to an embodiment, the image processing unit 308 may exchange data for image processing with the image management unit 310 so as to support an update of progress, a notification and/or a database (DB). When multiple modification operations are sequentially performed, the image processing unit 308 may perform control so that the representative image can be replaced at least one time point among time points of completion of respective modification operations. That is, the representative image may be updated multiple times.

The image management unit 310 may manage a representative image. The image management unit 310 may control a display operation for an image or image processing in association with the representative image processing unit 306 and the image processing unit 308. According to an embodiment, the image management unit 310 may control a representative image shown to the user. For example, the image management unit 310 may control an image before the modification and/or a modified image to be displayed as a representative image. For example, the image management unit 301 may control an image managed by the representative image management unit 310 until completion of the modification to be displayed as a representative image, and may control an image processed by the image processing unit 308 after the completion of the modification to be displayed as a representative image.

Figure 4:
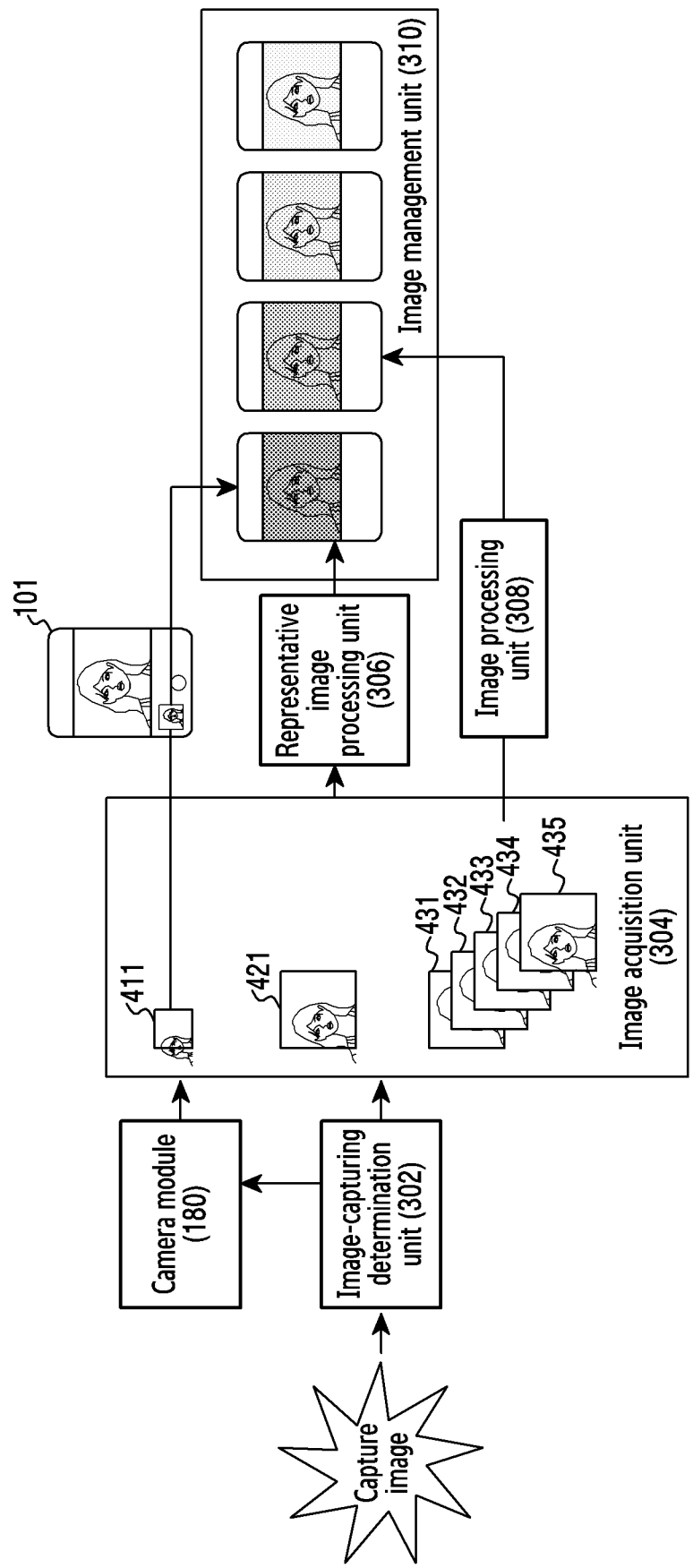
FIG. 4 illustrates an example of image processing operations according to various embodiments.

FIG. 4 illustrates an example of image processing operations according to various embodiments. FIG. 4 illustrates an example of image processing operations in a case where a modification operation is performed in a background process after image capturing (e.g., a case where the PPP scheme is selected), and exemplifies image process operations by the image-capturing determination unit 302, the image acquisition unit 304, the representative image processing unit 306, the image processing unit 308, and/or the image management unit 310 described with reference to FIG. 3.

Referring to FIG. 4, after the PPP scheme is selected by the image-capturing determination unit 302, images may be transferred from the camera module 180 to the image acquisition unit 304 through multiple streams. In an example of FIG. 4, the image-capturing determination unit 302 may control the camera module 180 so that three streams are used. According to another embodiment, the use of three streams may be controlled by the image acquisition unit 304.

An image 411 acquired through a first stream may be used as a thumbnail image. The image 411 may be used as a thumbnail image representing a photograph taken when a photographing application is executed in the electronic device 101, and also be used as a button for detecting a representative image display command of the user. For example, when the user selects (e.g., touches) a thumbnail image including the image 411, the representative image may be displayed by the image management unit 310.

An image 421 acquired through a second stream may be used a temporary representative image. The image 421 may be processed to be usable as a temporary representative image after access restriction is configured by the representative image processing unit 306. For example, the representative image processing unit 306 may assign authority to access the image 421 to the image management unit 310. As the image 421 is processed to be usable as the temporary representative image, the image 421 may be displayed when a thumbnail image before completion of the modification of the image processing unit 308 is selected.

Multiple images 431 to 435 acquired through a third stream may be used for modification operations (e.g., image quality improvement or effect addition) by the image processing unit 308. In an example of FIG. 4, three modification operations may be performed, and the image processing unit 308 may control the representative image to be updated whenever each modification operation is completed. For example, the image processing unit 308 may provide information on the modified image to the image management unit 310. As the representative image is updated, the user may identify the modified image.

According to various embodiments of the disclosure, an electronic device (e.g., the electronic device 101) may include a camera (e.g., the camera module 180), a memory (e.g., the memory 130), and a processor (e.g., the processor 120) operatively connected to the camera and the memory, wherein the processor performs control to acquire multiple images by using the camera, to store one of the multiple images as a first representative image, to generate a modified image by using at least one remaining image of the multiple images, and to store the modified image as a second representative image for replacing the first representative image.

According to various embodiments of the disclosure, the processor (e.g., the processor 120) may perform control to generate the modified image in a background process.

According to various embodiments of the disclosure, the processor (e.g., the processor 120) may perform control to restrict authority to access the first representative image.

According to various embodiments of the disclosure, the processor (e.g., the processor 120) may identify at least one of a capturing mode or the state of the electronic device (e.g., the electronic device 101), and determine whether to perform the generation of the modified image in the background process, according to the at least one of the capturing mode or the state of the electronic device.

According to various embodiments of the disclosure, the processor (e.g., the processor 120) may perform the generation of the modified image in the background process when a predefined condition is satisfied, wherein the predefined condition includes one of no requirement of immediacy of generating a final result of a captured image within a predetermined time, an inner temperature of the electronic device, corresponding to a threshold value or lower, or existence of an allocable storage space for modification in a memory or a file system.

According to various embodiments of the disclosure, the processor (e.g., the processor 120) may control the background process to be operated according to memory when an allocable storage space for modification exists in the memory, and may control the background process to be operated according to the file system when the allocable storage space for modification exists in the file system.

According to various embodiments of the disclosure, the electronic device (e.g., the electronic device 101) may further include a display (e.g., the display device 160, wherein the processor may control information on the modification operation for the generation of the modified image to be displayed on the display.

According to various embodiments, the information on the modification may include at least one of information indicating that the modification is being performed, information indicating a progress rate of the modification, and information indicating a type of a performed modification operation.

According to various embodiments, the information on the modification may be displayed while the first representative image is displayed, or may be displayed in a quick panel.

According to various embodiments, the processor may perform control to store the first representative image as a final representative image when an event causing suspension of the modification occurs during the modification for generating the modified image.

Figure 5:
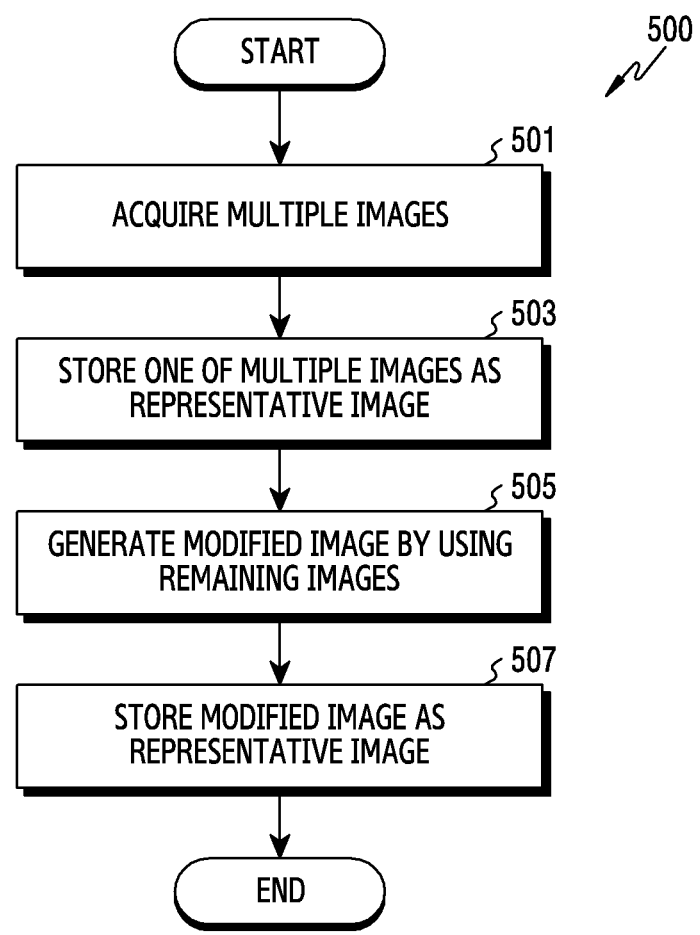
FIG. 5 is a flow chart illustrating processing of an image in an electronic device according to various embodiments.
Figure 6:
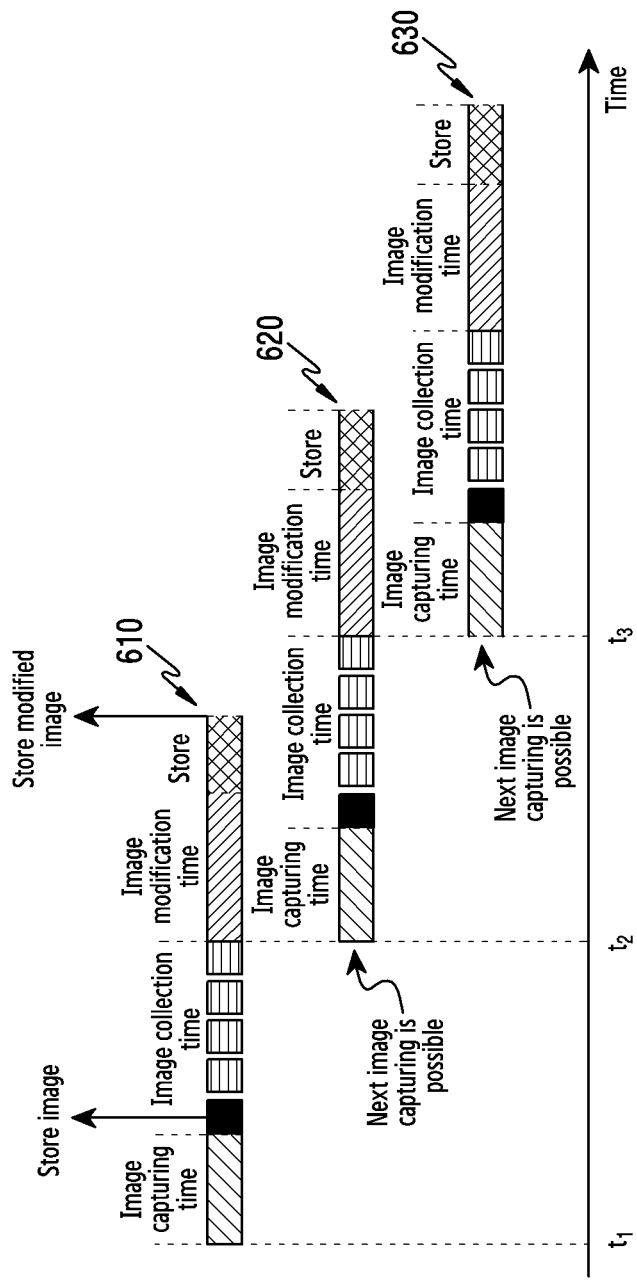
FIG. 6 illustrates an example of image capturing sequences in an electronic device according to various embodiments.

FIG. 5 is a flow chart 500 illustrating processing of an image in an electronic device according to various embodiments. FIG. 6 illustrates an example of image capturing sequences in an electronic device according to various embodiments. The entity for performing an operation in the flow chart 500 illustrated in FIG. 5 may be understood as the electronic device 101 or a component (e.g., the processor 120) of the electronic device 101.

Referring to FIG. 5, in operation 501, the electronic device 101 (e.g., the processor 120) may acquire multiple images. The multiple images may be divided according to the usage. For example, the multiple images may include an image for thumbnail, an image for a temporary representative image, and/or at least one image for a modification operation.

In operation 503, the electronic device 101 may store one of the multiple images as a representative image. One of unmodified multiple images may be used as a temporary representative image displayed while the modification operation is performed. The temporary representative image may be different from a final representative image, and thus, the electronic device 101 may restrict authority to access another application or function for the temporary representative image.

In operation 505, the electronic device 101 may generate a modified image by using at least one of the remaining images. The electronic device 101 may use a background process to generate the modified image so as to process another input of the user while the modification operation is performed. Since the background process is used, the electronic device 101 may perform another image-capturing operation while the modification operation is performed. For example, referring to FIG. 6, the image modification operation may be performed in the background process after an image capturing time and an image collection time of a first sequence 610 at time point $t_1$. A second sequence 620 may start after the image modification time of the first sequence 610 starts, and similarly, a third sequence 630 may start after the image modification time of the second sequence time starts.

In operation 507, the electronic device 101 may store the modified image as a representative image. Once the modification is completed, the electronic device 101 may store the same as a final representative image so as to display the modified image. The electronic device 101 may store the modified image as another representative image for replacing the temporary representative image. Since the modified image is the final representative image and may thus have an access authority configuration different from that of the temporary representative image.

In the embodiment described with reference to FIGS. 5 and 6, after the image modification operation, the modified image may be stored as a representative image. According to an embodiment, when the modification includes multiple modification operations (e.g., image quality improvement according to a first technique and image quality improvement and effect addition according to a second technique), the modified image may be updated whenever each modification operation is completed. As the modified image is updated, the representative image may be also updated.

Figure 7:
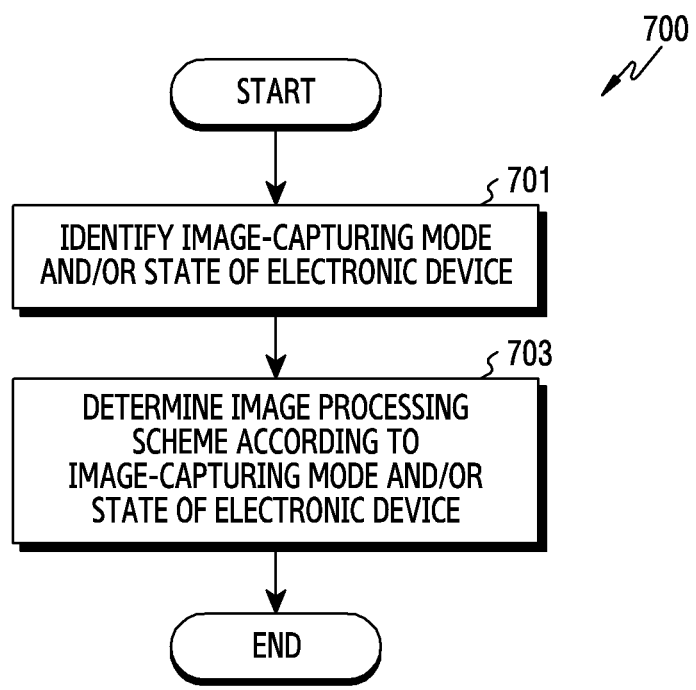
FIG. 7 is a flow chart illustrating determining of an image processing scheme in an electronic device according to various embodiments.

FIG. 7 is a flow chart 700 illustrating determining of an image processing scheme in an electronic device according to various embodiments. The entity for performing an operation in the flow chart 700 illustrated in FIG. 7 may be understood as the electronic device 101 or a component (e.g., the processor 120) of the electronic device 101.

Referring to FIG. 7, in operation 701, the electronic device 101 (e.g., the processor 120) may identify an image-capturing mode and/or the state of the electronic device 101.

The image-capturing mode may be divided by at least one applied modification operation. The image-capturing mode may be determined by a selection of a user or determination (e.g., determination based on a surrounding environment) of the electronic device 101. The state of the electronic device 101 may include the state of a resource (e.g., a memory usage state), a physical condition (e.g., an overheating degree), and/or whether to perform a follow-up operation (e.g., an operation of attaching the captured image to another application after image capturing or an operation of displaying a final image after image capturing) for an image-captured result.

In operation 703, the electronic device 101 may determine an image processing scheme according an image-capturing mode and/or the state of the electronic device 101. The image processing scheme may be divided by whether to perform the modification operation by the background process and/or at least one applied modification operation. According to the image processing scheme, the electronic device 101 may determine the number of images to be acquired from a camera module (e.g., the camera module 180), at least one modification operation to be performed, and/or scheduling of image processing. For example, when a resource of the electronic device 101 is not sufficient, the electronic device 101 may determine not to use the background process. In another example, when, in the image-capturing mode, no image modification is required, or image modification which can be processed with an operation amount equal to or less than a predetermined level is required, the electronic device 101 may determine not to use the background process.

Figure 8:
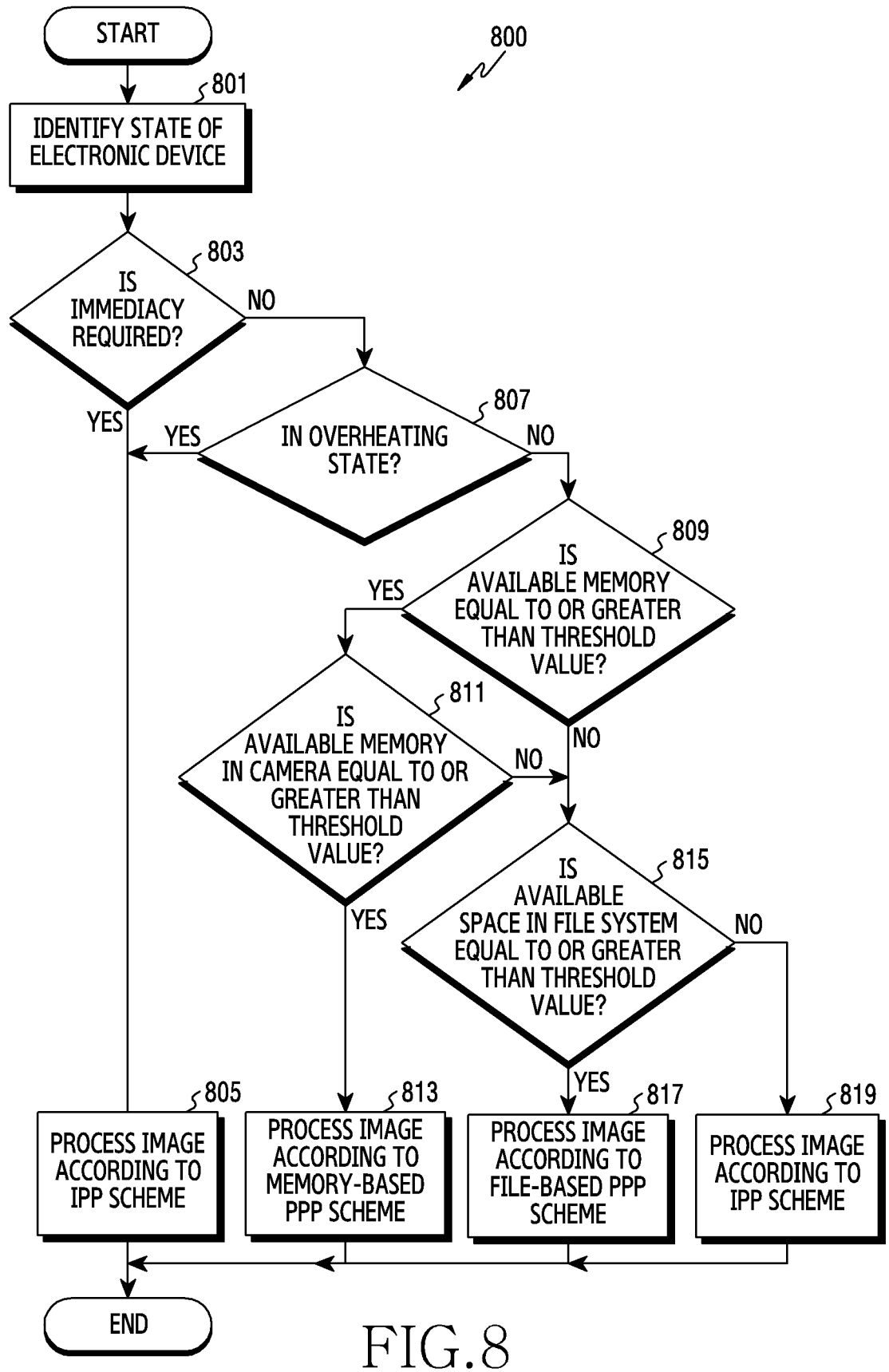
FIG. 8 is a flow chart illustrating determining of an image processing scheme according to the state of an electronic device according to various embodiments

FIG. 8 is a flow chart 800 illustrating determining of an image processing scheme according to the state of an electronic device according to various embodiments. The entity for performing an operation in the flow chart 800 illustrated in FIG. 8 may be understood as the electronic device 101 or a component (e.g., the processor 120) of the electronic device 101.

Referring to FIG. 8, in operation 801, the electronic device 101 may identify the state of the electronic device 101. The state of the electronic device 101 may include the state of a resource (e.g., a memory usage state), a physical condition (e.g., an overheating degree), and/or whether to perform a follow-up operation (e.g., an operation of attaching the captured image to another application after image capturing or an operation of displaying a final image after image capturing) for an image-captured result.

In operation 803, the electronic device 101 may determine whether the electronic device 101 is in a situation where immediacy is required. The situation where the immediacy is required may mean a case where a final result of the captured image is to be generated within a predetermined time. For example, when an operation is performed in an attach mode in which a final image is provided for another application after image capturing or when the final image is to be displayed after image capturing, it may be determined that the immediacy is required. When the immediacy is required, the electronic device 101 may process the image according to the IPP scheme in operation 805.

When the immediacy is not required, the electronic device 101 may identify, in operation 807, whether the electronic device 101 is in an overheating state. The overheating state may mean a state in which an inner temperature of the electronic device 101 exceeds a threshold value. The electronic device 101 may measure the temperature by using a sensor (e.g., the sensor module 176 of FIG. 1), and compare the measured temperature with the threshold value. When the electronic device 101 is in the overheating state, the electronic device 101 may process the image according to the IPP scheme in operation 805.

When the electronic device 101 is not in the overheating state, the electronic device 101 may identify, in operation 809, whether an available memory is equal to or greater than a threshold value. For example, the threshold value may be defined according to a limit for an out of memory (OOM) declaration (e.g., double of the limit). If the available memory is equal to or greater than the threshold value, the electronic device 101 may identify, in operation 811, whether an available memory (e.g., a buffer pool) in the camera is equal to or greater than a threshold value. On the other hand, if the available memory is less than the threshold value, or an available memory in the camera is less than the threshold value, the electronic device 101 may identify, in operation 813, whether an available space in the file system is equal to or greater than a threshold value. In order to perform the image modification operation in the background process, a space for storing multiple images (e.g., the images 431 to 435 of FIG. 4) and storing data generated during the modification operation may be required. More prompt reading/writing can be performed in the space in the memory compared to the space in the file system, and thus, the electronic device 101 may determine availability of the memory first and then may determine availability of the file system. The threshold value in operation 809, the threshold value in operation 811, and the threshold value in operation 813 may be independent or different from each other, or at least a part of the threshold values may be identical to each other.

If the available memory in the camera is equal to or greater than the threshold value, the electronic device 101 may process an image according to a memory-based PPP scheme in operation 815. The memory-based PPP scheme may mean a scheme of allocating a storage space in the memory to the background process for the image modification operation. For example, the electronic device 101 may perform control to operate the background process according to the memory. If the available memory in the camera is less than the threshold value, and the available memory in the file system is equal to or greater than the threshold value, the electronic device 101 may process the image according to a file-based PPP scheme in operation 817. The file-based PPP scheme may mean a scheme of allocating a storage space in the file system to the background process for the image modification operation. For example, the electronic device 101 may perform control to operate the background process according to the file system. If the available space in the file system is less than the threshold value, the electronic device 101 may process the image according the IPP scheme in operation 819.

According to the above-described various embodiments, the electronic device 101 may process an image in the background process. An image shown to the user while the modification operation is performed in the background process corresponds to a temporary representative image and may be different from the final representative image. In order to inform the user of possibility of the representative image update, the electronic device 101 may display information on the image modification according to various embodiments. Hereinafter, embodiments for displaying the information on the image modification will be described.

Figure 9:
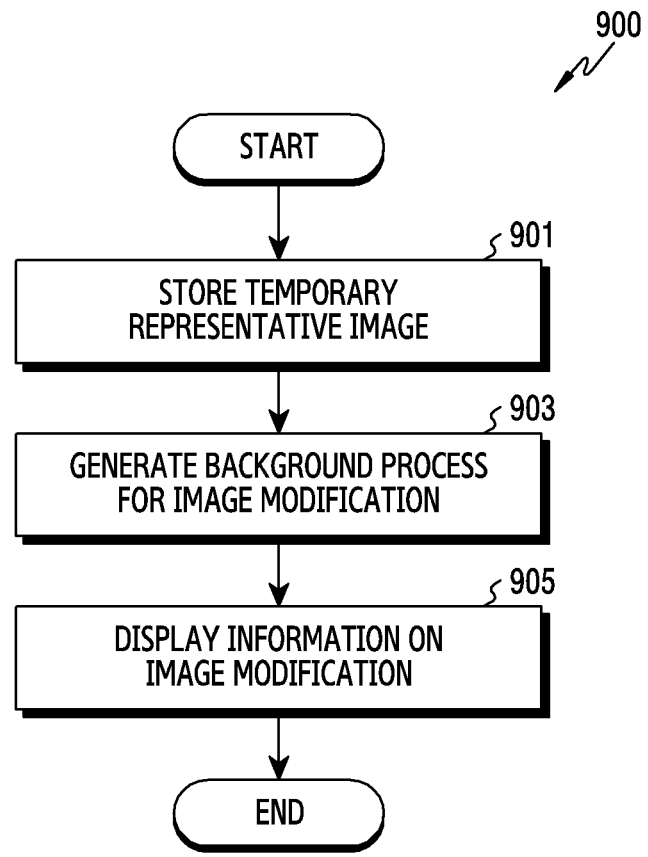
FIG. 9 is a flow chart illustrating displaying of information on image modification in an electronic device according to various embodiments.
Figure 10:
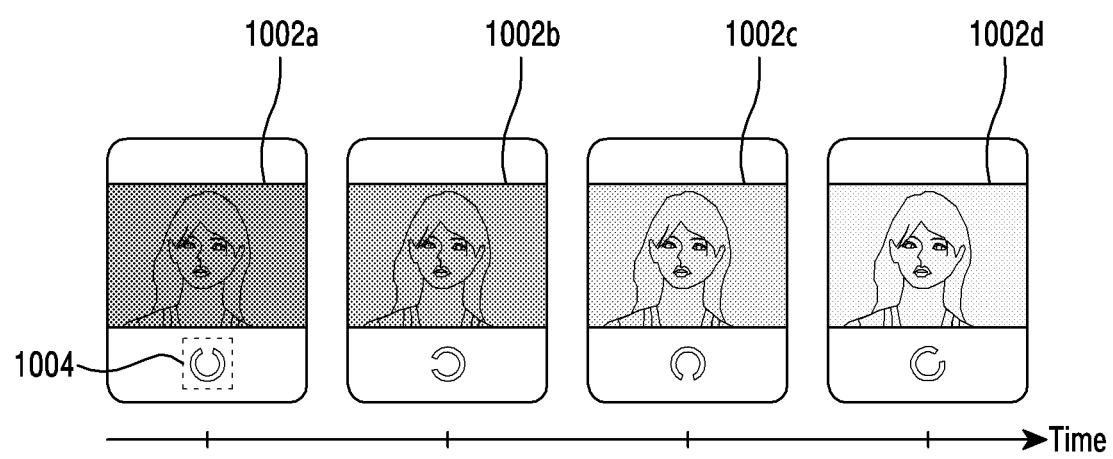
FIG. 10 illustrates an example of indicating that image modification is being performed in an electronic device according to various embodiments.
Figure 11:
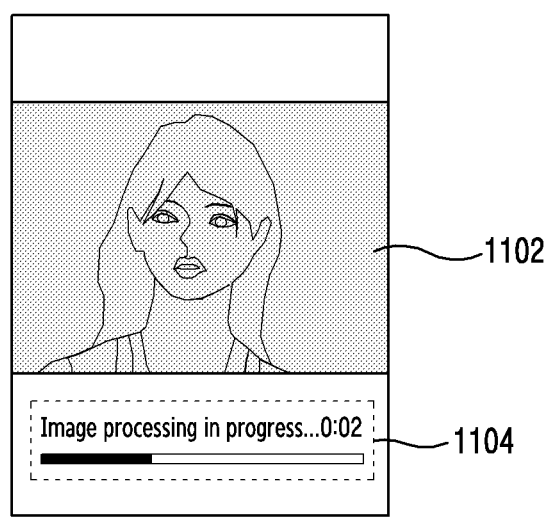
FIG. 11 illustrates an example of an indicator indicating a progress rate of image modification in an electronic device according to various embodiments.
Figure 12:
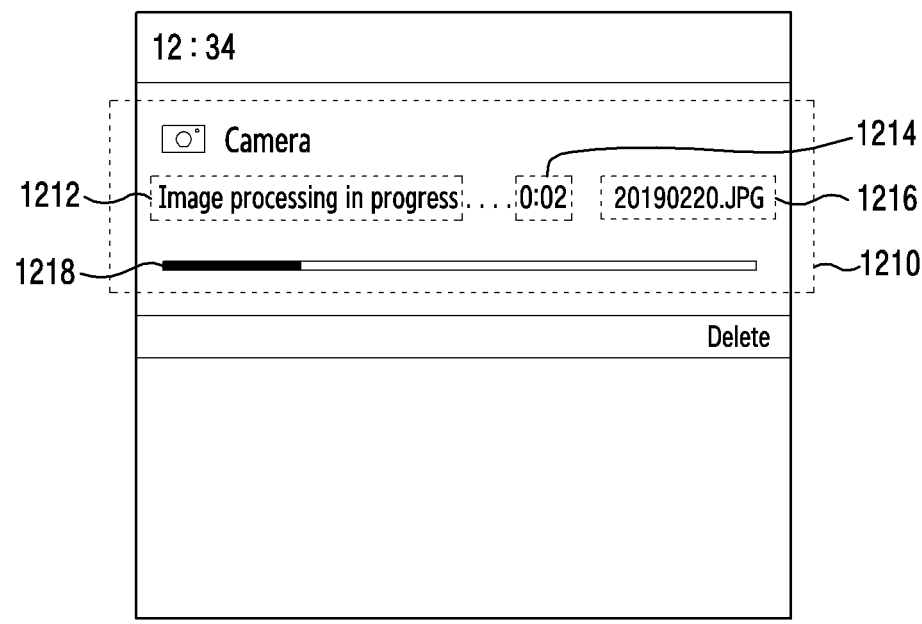
FIG. 12 illustrates an example of a notification indicating a progress rate of image modification in an electronic device according to various embodiments.

FIG. 9 is a flow chart 900 illustrating displaying of information on image modification in an electronic device according to various embodiments. FIG. 10 illustrates an example of indicating that image modification is being performed in an electronic device according to various embodiments. FIG. 11 illustrates an example of an indicator indicating a progress rate of image modification in an electronic device according to various embodiments. FIG. 12 illustrates an example of a notification indicating a progress rate of image modification in an electronic device according to various embodiments. The entity for performing an operation in the flow chart 900 illustrated in FIG. 9 may be understood as the electronic device 101 or a component (e.g., the processor 120) of the electronic device 101.

Referring to FIG. 9, in operation 901, the electronic device 101 may store a temporary representative image. An image that is not modified may be used as a temporary representative image. The temporary representative image may be displayed as a representative image until a modification operation is completed.

In operation 903, the electronic device 101 may generate a background process for image modification. When a modification operation for an image is performed in a background process, the electronic device 101 may perform another operation (e.g., detection of an input of a user) during the image modification operation.

In operation 905, the electronic device 101 may display information on the image modification. The information on the image modification may include at least one of information indicating that the modification operation is being performed, information indicating a progress rate of the modification operation, and/or information indicating the type of the performed modification operation. For example, while the image is modified in the background process, the electronic device 101 may display an item (e.g., an icon, an indicator, or a notification) informing the user of the image modification in progress.

According to an embodiment, while the representative image is displayed, information indicating the image modification in progress may be displayed. For example, as shown in FIG. 10, the electronic device 101 may display that the image modification is being formed by displaying an indicator 1004 under a representative image 1002a. As the modification operation is performed, the updated representative images 1002b, 1002C, and 1002d may be sequentially displayed, and the indicator 1004 may rotate to represent that the image modification is in progress. In another example, as shown in FIG. 11, a bar-type indicator 1104 indicating a progress rate of the modification operation may be displayed under a representative image 1102.

According to another embodiment, information indicating that the image modification is in progress may be displayed through a separate interface that is different from an interface for displaying the representative image. For example, as shown in FIG. 12, a notification 1210 indicating a progress rate of the modification operation may be displayed by using a quick panel. Referring to FIG. 12, the notification 1210 may include a phrase 1212 indicating that the modification is in progress, information 1214 indicating a time for which the modification operation is performed, a name 1216 of a file subject to modification, and/or a bar 1218 indicating a progress rate.

According to above-described various embodiments, a modification operation for an image is performed in the background process, and information on the modification operation may be displayed. According to an embodiment, during the modification operation, a situation in which it is difficult to maintain the modification operation due to a change in the state of the electronic device 101 (e.g., a change in the state of a software or hardware resource) may occur. When a situation (e.g., hereafter, referred to as an "exceptional situation") in which the modification operation is to be suspended occurs, the final representative image may not be generated. Hereinafter, embodiments for dealing with the exceptional situation will be described.

Figure 13:
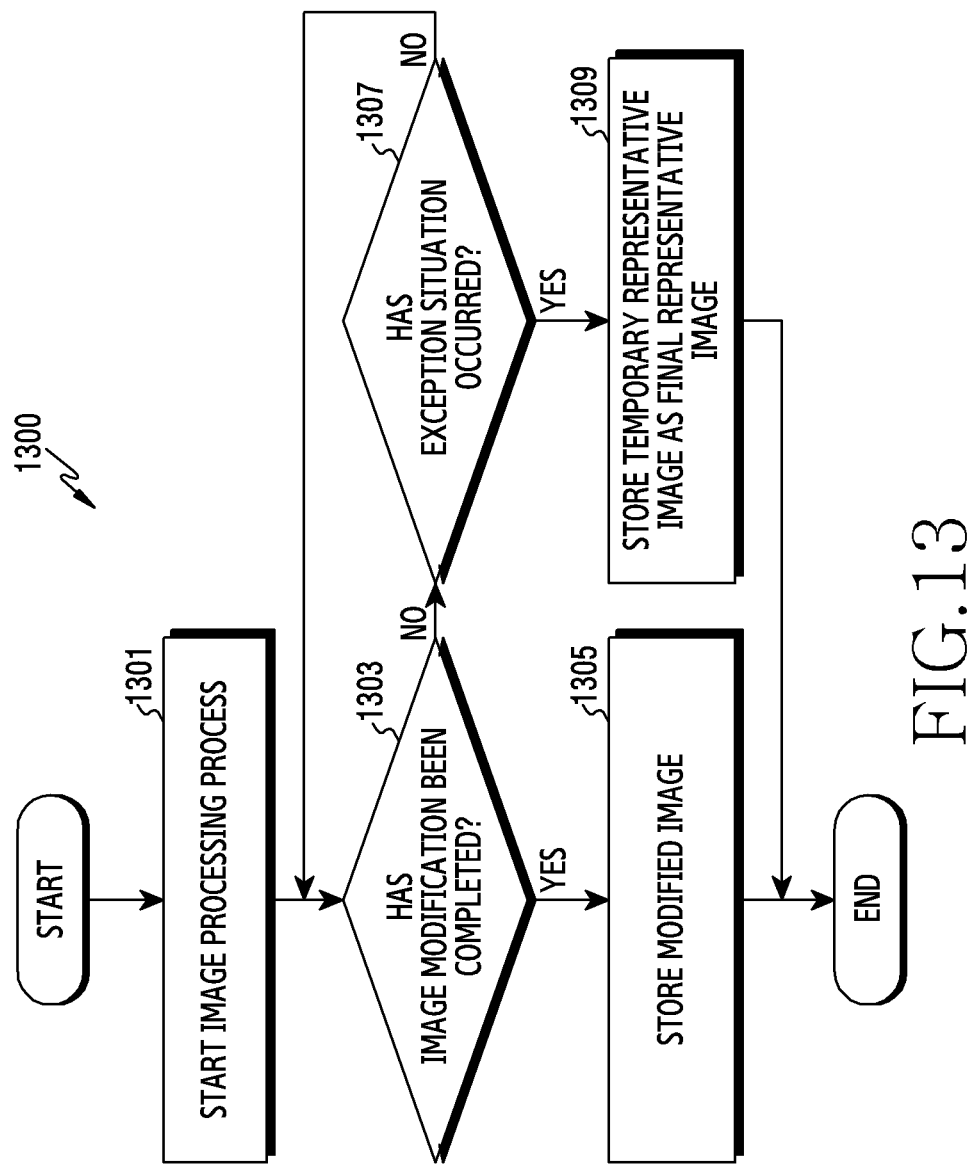
FIG. 13 is a flow chart illustrating processing of an exceptional situation in an electronic device according to various embodiments.
Figure 14:
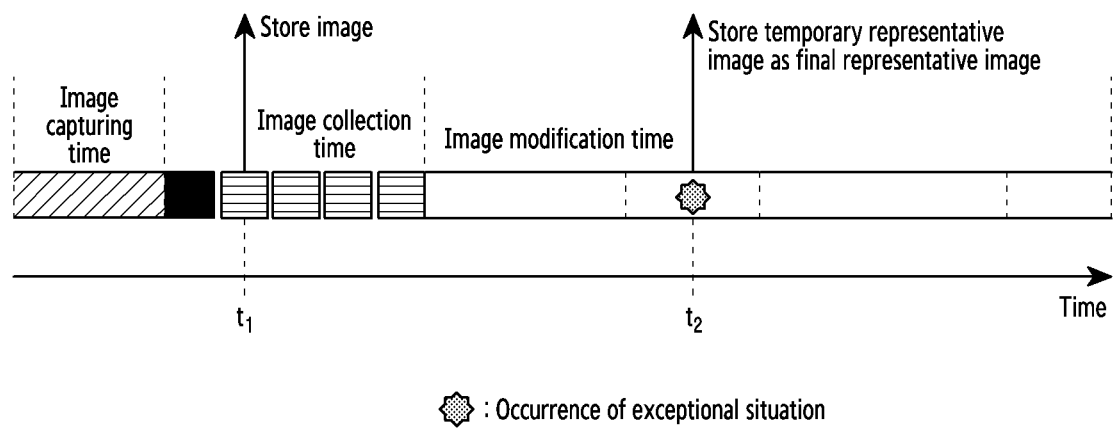
FIG. 14 illustrates an example at a time point of occurrence of an exceptional situation in an electronic device according to various embodiments.

FIG. 13 is a flow chart 1300 illustrating processing of an exceptional situation in an electronic device according to various embodiments. FIG. 14 illustrates an example at a time point of occurrence of an exceptional situation in an electronic device according to various embodiments. The entity for performing an operation in the flow chart 1300 illustrated in FIG. 13 may be understood as the electronic device 101 or a component (e.g., the processor 120) of the electronic device 101.

Referring to FIG. 13, in operation 1301, the electronic device 101 (e.g., the processor 120) may start an image processing process. For example, the electronic device 101 may determine a modification operation in a background process according an image-capturing mode and the state of the electronic device 101, store a temporary representative image, and then generate a background process. For example, referring to FIG. 14, the electronic device 101 may store the temporary representative image at time point $t_1$ and perform image collection and image modification.

In operation 1303, the electronic device 101 may identify whether the image modification has been completed. Once the image modification has been completed, the electronic device 101 may store the modified image in operation 1305. The modified image may replace the previously stored temporary representative image.

If the image modification has not been completed, the electronic device 101 may identify whether an exceptional situation occurs in operation 1307. The exceptional situation corresponds to a state in which the modification operation cannot be continued, and may be detected by the change in the state of the electronic device 101. For example, when a storage space of the electronic device 101 is physically separated, a battery is used up or separated, or a system is shut down, the electronic device 101 may detect occurrence of the exceptional situation.

When the exceptional situation occurs, the electronic device 101 may store the temporary representative image as a final representative image in operation 1309. Since the modification operation cannot be performed any longer, a temporarily stored representative image is confirmed as a final representative image. For example, the electronic device 101 may move an image stored as the temporary representative image to another storage space (e.g., a storage space in which no access restriction is configured). For example, referring to FIG. 14, an exceptional situation at time point $t_2$, and the electronic device 101 may store the temporary representative image as a final representative image.

According to an embodiment, when the modification operation includes multiple modification operations, at least a part of the modification operation may be completed before the exceptional situations occurs. When the at least a part of the modification operation is completed, the representative image is updated with the modified image. In a case in which there is an image to which the at least a part of the modification operation is applied, when the exceptional situation occurs, the electronic device may store the image to which the at least a part of the modification operation is applied, instead of the initial temporary representative image, as a final representative image.

According to various embodiments of the disclosure, an operation method of an electronic device (e.g., the electronic device 101) may include acquiring multiple images, storing one of the multiple images as a first representative image, generating a modified image by using at least one remaining image of the multiple images, and storing the modified image as a second representative image for replacing the first representative image.

According to various embodiments of the disclosure, the generating of the modified image may include generating the modified image in a background process.

According to various embodiments of the disclosure, the method may further include performing control to restrict authority to access the first representative image.

According to various embodiments of the disclosure, the method may further include identifying at least one of a capturing mode or a state of the electronic device (e.g., the electronic device 101), and determining whether to perform the generating of the modified image in the background process, according to the at least one of the capturing mode or the state of the electronic device.

According to various embodiments of the disclosure, the determining of whether to perform the generating of the modified image in the background process may include determining to perform the generating of the modified image in the background process when a predefined condition is satisfied, wherein the predefined condition may include one of no requirement of immediacy of generating a final result of a captured image within a predetermined, an inner temperature of the electronic device (e.g., the electronic device 101), corresponding to a threshold value or lower, or existence of an allocatable storage space for modification in a memory or a file system.

According to various embodiments of the disclosure, the determining whether to perform the generating of the modified image in the background process may include controlling the background process to be operated according to the memory when the allocable storage space for modification exists in the memory, and controlling the background process to be operated according to the file system when the allocable storage space for modification exists in the file system.

According to various embodiments of the disclosure, the method may further include displaying information on modification for generating the modified image.

According to various embodiments of the disclosure, the information on the modification may include at least one of information indicating that the modification is being performed, information indicating a progress rate of the modification, and information indicating a type of a performed modification operation.

According to various embodiments of the disclosure, the information on the modification may be displayed while the first representative image is displayed, or may be displayed in a quick panel.

According to various embodiments of the disclosure, the method may further include storing the first representative image as a final representative image when an event causing suspension of the modification occurs during the modification for generating the modified image.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An operation method of an electronic device, the method comprising:
acquiring multiple images by a camera;
identifying at least one of a capturing mode or a state of the electronic device, wherein the state of the electronic device includes at least one of a state of a resource, a physical condition, or whether to perform a follow-up operation for image-captured result;
determining to perform generating of a modified image in a foreground process or a background process based on at least one of the state of the electronic device or operation amount of image modification according to the capturing mode;
storing one of the multiple images as a first representative image;
generating the modified image in the foreground process or the background process by using at least one remaining image of the multiple images; and
storing the modified image as a second representative image for replacing the first representative image.

2. The method of claim 1, further comprising performing control to restrict authority to access the first representative image.

3. The method of claim 1, wherein the determining of whether to perform the generating of the modified image in the foreground process or the background process comprises determining to perform the generating of the modified image in the background process when a predefined condition is satisfied,
wherein the predefined condition comprises one of no requirement of immediacy of generating a final result of a captured image within a predetermined time, an inner temperature of the electronic device, corresponding to a threshold value or lower, or existence of an allocatable storage space for modification in a memory or a file system.

4. The method of claim 3, wherein the determining whether to perform the generating of the modified image in the background process comprises:
controlling the background process to be operated according to the memory when the allocatable storage space for modification exists in the memory; and
controlling the background process to be operated according to the file system when the allocatable storage space for modification exists in the file system.

5. The method of claim 1, further comprising displaying information on modification for generating the modified image.

6. The method of claim 5, wherein the information on the modification comprises at least one of information indicating that the modification is being performed, information indicating a progress rate of the modification, and information indicating a type of a performed modification operation.

7. The method of claim 5, wherein the information on the modification is displayed while the first representative image is displayed, or is displayed in a quick panel.

8. The method of claim 1, further comprising storing the first representative image as a final representative image when an event causing suspension of the image modification occurs during the image modification for generating the modified image.

9. The method of claim 1, wherein generating the modified image comprises applying at least one of noise reduction, image tone changing, beauty effect application, resolution adjustment, brightness adjustment, a blurring, sharpening, or softening effect, a high dynamic range (HDR) effect, and a bokeh effect to the at least one remaining image.

10. An electronic device comprising:
a camera;
a memory; and
a processor operatively connected to the camera and the memory,
wherein the processor performs control to:
acquire multiple images by using the camera,
identify at least one of a capturing mode or a state of the electronic device, wherein the state of the electronic device includes at least one of a state of a resource, a physical condition, or whether to perform a follow-up operation for image-captured result,
determine to perform generation of a modified image in a foreground process or a background process based on at least one of the state of the electronic device or operation amount of image modification according to the capturing mode,
store one of the multiple images as a first representative image,
generate the modified image by using at least one remaining image of the multiple images, and
store the modified image as a second representative image for replacing the first representative image.

11. The electronic device of claim 10, wherein the processor performs control to restrict authority to access the first representative image.

12. The electronic device of claim 10, wherein the processor determines to perform the generation of the modified image in the foreground process or the background process when a predefined condition is satisfied,
wherein the predefined condition comprises one of no requirement of immediacy of generating a final result of a captured image within a predetermined time, an inner temperature of the electronic device, corresponding to a threshold value or lower, or existence of an allocable storage space for modification in a memory or a file system.

* * * * *